United States Patent [19]
Schachter
[11] 4,157,534
[45] Jun. 5, 1979

[54] LOCKING SYSTEM FOR HOTELS

[76] Inventor: Jacob Schachter, 135 New York Ave., Huntington, N.Y. 11743

[21] Appl. No.: 741,894

[22] Filed: Nov. 15, 1976

[51] Int. Cl.[2] ........................ H04Q 9/00; E05B 49/00

[52] U.S. Cl. ............................... 340/147 MD; 70/264

[58] Field of Search ........ 340/147 MD, 149 R, 149 A

[56] References Cited

U.S. PATENT DOCUMENTS

| | | | |
|---|---|---|---|
| 3,800,284 | 3/1974 | Zucker et al. | 340/149 R |
| 3,848,229 | 11/1974 | Perron et al. | 340/149 A |
| 3,859,634 | 1/1975 | Perron et al. | 340/149 A |
| 3,911,397 | 10/1975 | Freeny, Jr. | 340/147 MD |
| 3,944,976 | 3/1976 | France | 340/149 A |

*Primary Examiner*—Donald J. Yusko
*Attorney, Agent, or Firm*—Charles E. Temko

[57] ABSTRACT

The disclosure relates to a locking mechanism and a related control system. It is intended for use in hotels and other private and public buildings which require a high degree of security, and which also make keys available to the general public, or to persons whose reliability is unknown. The system includes a plurality of expendable self-powered key elements each defining an individual code, a validator element under the control of hotel desk personnel for assigning the codes to specific rooms at checkin time, memory means at each room receiving information from the validator element and comparator means for comparing the information received from the validator element with the code on the assigned key for a match prior to activating the lock mechanism. The validator element cancels the memory means at the individual room at checkout time upon surrender of the key, or, in the event the guest leaves taking the key with him, the key can be invalidated by the assignment of a new code. The power source on the key is used to actuate the lock opening means, thereby eliminating the necessity of separate power means at the room door.

1 Claim, 20 Drawing Figures

VALIDATOR PHASE TIMING

1 IN 8 DECODER
Ø OUTPUTS
FF
J
CLK
K
CLEAR
CLOCK
POWER ON RESET OUTPUT
POR
MONO-STABLE
WRITE OUTPUT
WRITE FF
CLK OUTPUT
LTR=16
CTR=255
CTR=48

FIG. 10
VALIDATOR CIRCUITRY
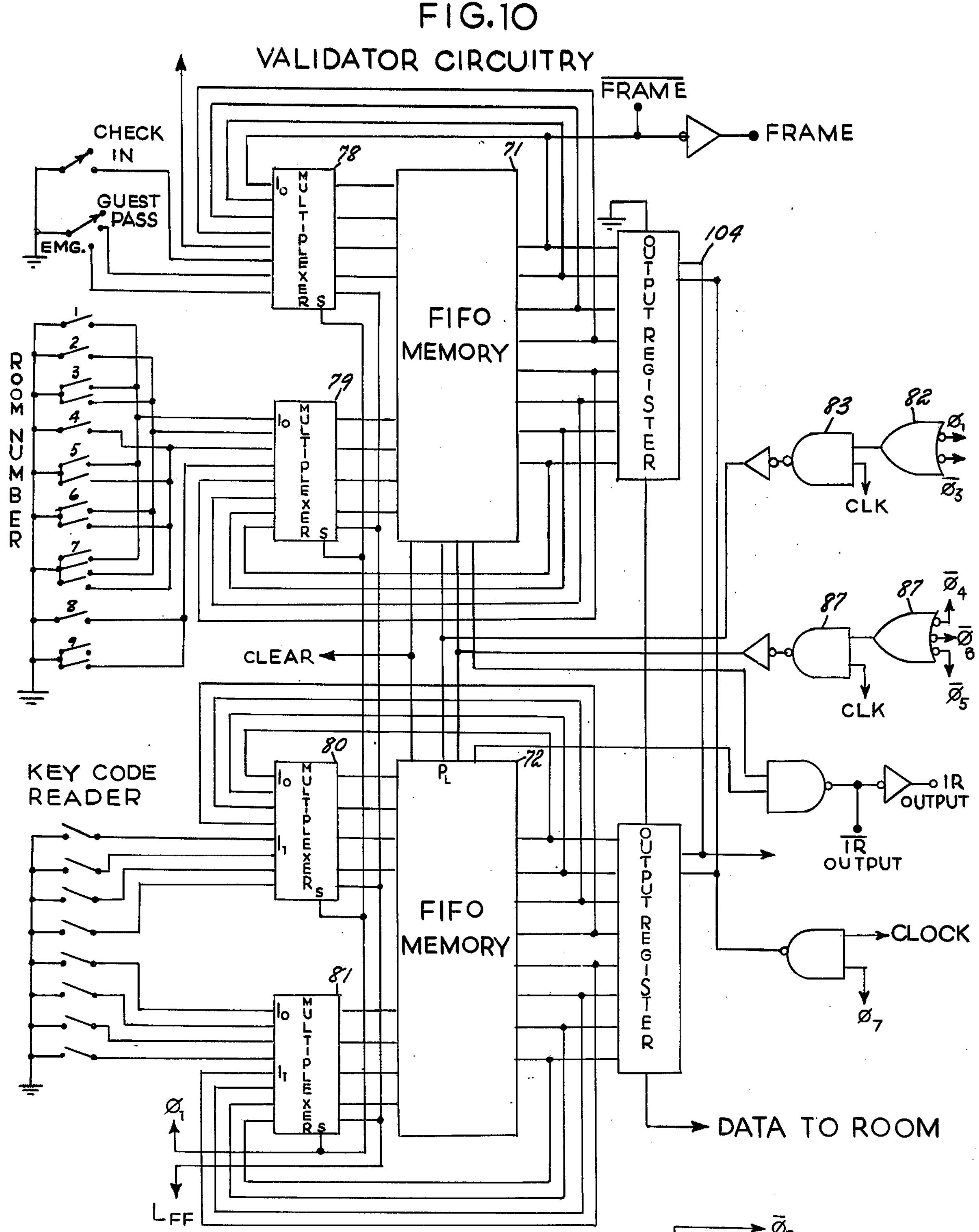
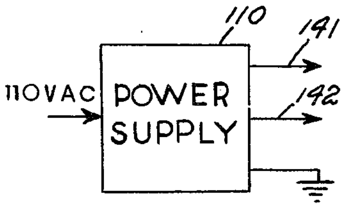
FIG. 6
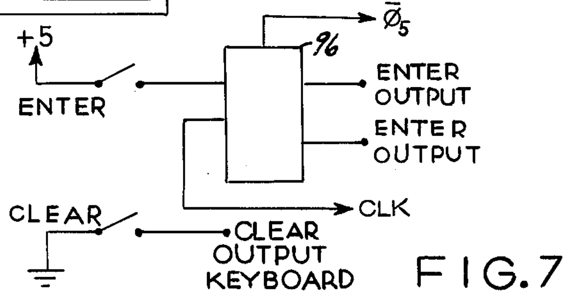
FIG. 7

LOCK PHASE TIMING

LOCK CIRCUITRY PHASE TIMING

| ADDRESS LINES | | | |
|---|---|---|---|
| $A_1$ | $A_2$ | $A_3$ | |
| 0 | 0 | 0 | GUEST KEYS |
| 0 | 0 | 0 | |
| 0 | 0 | 0 | |
| 0 | 1 | 1 | |
| 1 | 0 | 0 | PASS KEYS |
| 1 | 0 | 1 | |
| 1 | 1 | 0 | EMERGY KEYS |
| 1 | 1 | 1 | |

LOCKING SYSTEM FOR HOTELS

BACKGROUND OF THE INVENTION

Most locking systems currently in use in hotels, motels, and similar applications have pin-tumbler locks fitted with corresponding keys, and, one or more levels of mastering are used. As a practical matter, it is impossible to prevent guests from taking or duplicating individual room keys. Compromising of master keys is also relatively common, since the background of hotel employees cannot always be thoroughly investigated.

Other systems which have been proposed, or used, replace the key with a card using optical, magnetic or other means of encoding. Such systems suffer from complete failure when power is lost, thus preventing a guest from entering his own room under such circumstances.

In U.S. Pat. No. 3,763,676 and U.S. Pat. No. 3,842,629, a system is proposed which overcomes this difficulty, but the construction requires power and signal wiring to each individual door. In the case of existing buildings, building codes requiring complicated installation of power lines make installation of such systems economically unsound. Further, with a failure of power, such systems are also inoperative.

SUMMARY OF THE INVENTION

Briefly stated, the present disclosure contemplates a system consisting of a lock assembly for each room, a monitor unit for each room, a central control unit normally located at the hotel desk, a key validating device operable by the desk clerk, and a plurality of room keys which may be coded by various means, and which include a self-contained power source, normally in the form of a flat laminar type DC battery.

The system contemplates that at time of check-in, the room clerk selects a key which contains a unique combination already encoded in printed circuit form. He inserts the key into the key validating unit, and at the same time enters the room number or numbers for which the key is to be validated. This results in the sending of a signal to the central control unit which stores this information. When the guest arrives at his room, he inserts the key into a slotted opening adjacent the door, thus completing circuits enabling power from the battery on the key to be applied to the lock mechanism, enabling the lock to "read" the code. The code is used to modulate a microwave carrier which is transmitted from the monitor unit to the lock mechanism at the door of the room. When the code on the key corresponds to that which has been received by the lock mechanism, the lock mechanism permits the door to open. Memory circuits capable of retaining a code over an extended period of time in the absence of power are provided at the lock mechanism, so that should the central control unit fail, a guest can still enter his room using a self-powered key.

Provision is made for cancellation of the validation of individual keys used by a guest at checkout time, without effecting the validation of pass keys or emergency keys validated for the same room.

BRIEF DESCRIPTION OF THE DRAWINGS

In the drawings, to which reference will be made in the specification, similar reference characters have been employed to designate corresponding parts throughout the several views.

FIG. 6 is a schematic diagram showing a power supply for the key validator element.

FIG. 7 is a schematic diagram showing activation of entering and clearing functions.

FIG. 10 is a schematic wiring diagram of memory circuitry forming a part of the key validator element.

DETAILED DESCRIPTION OF THE DISCLOSED EMBODIMENT

Figures 1, 2, 3, 17:
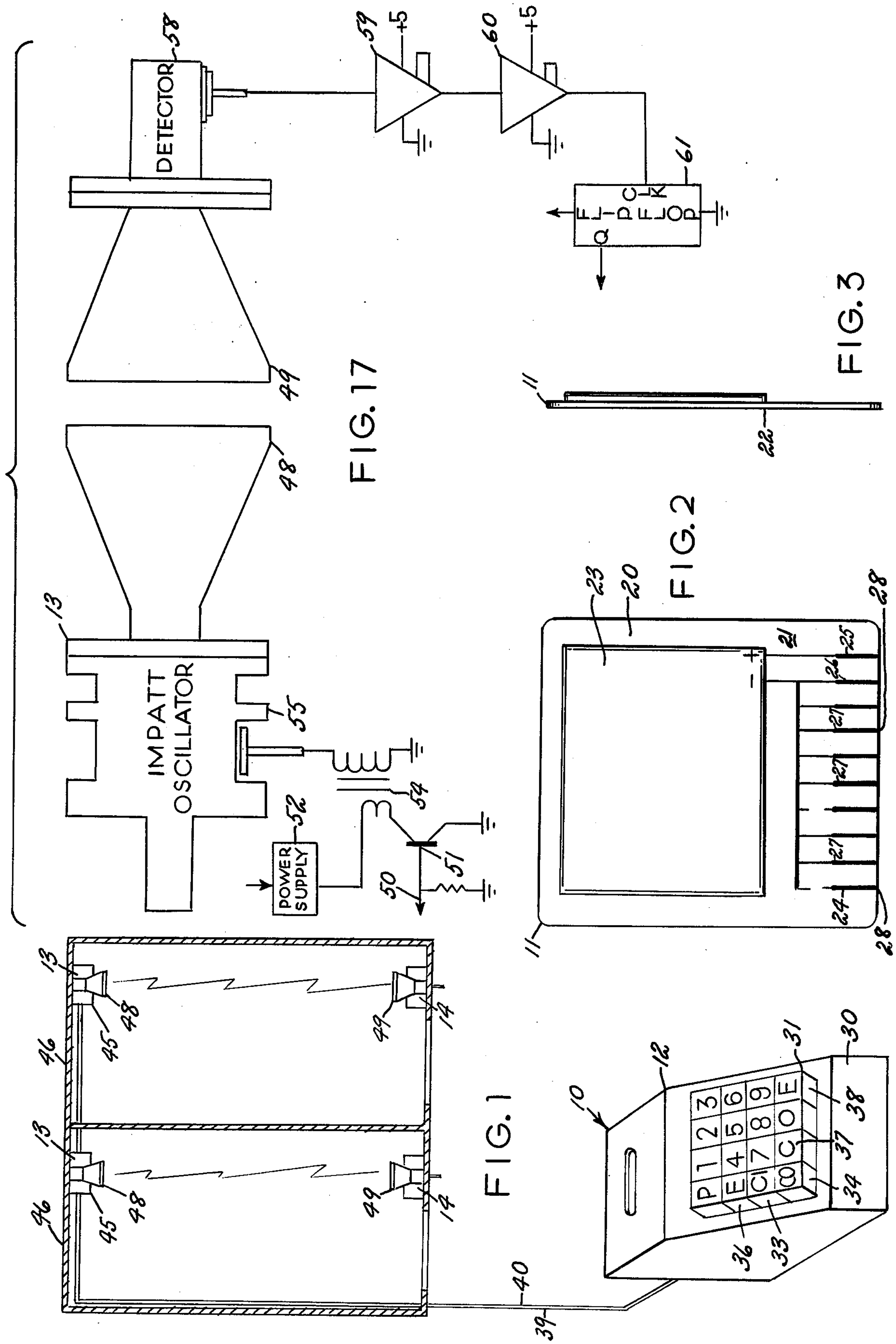
FIG. 1 is a schematic view in perspective showing an embodiment of the invention in installed condition within a hotel or similar building.
FIG. 2 is a side elevational view of one of a plurality of keys forming part of the disclosed embodiment.
FIG. 3 is an end elevational view of the key as seen from the left hand portion of FIG. 2.
FIG. 17 is a schematic view of a microwave transmission structure located in an individual room.

Before entering into a detailed consideration of the structural aspects of the embodiment, a brief outline of the functional aspects of the same is considered apposite.

The system contemplates a key validator element which is normally positioned at the reception desk of a hotel, and which is connected by a low voltage two wire system to a plurality of radio frequency oscillator units which are positioned at a suitable location, one in each guest room near an already present source of 110–117 volt alternating current. The oscillators continuously transmit pulse code information which is received by a corresponding detector, amplified and fed to lock circuitry which has been conditioned to respond only to signals intended for a particular room. The validator element continues to send information, on substantially a 24 hour a day basis, while the lock circuitry for individual rooms, not being connected to a power source, remain essentially dormant until called upon to check an inserted key which carries its own power source in the form of a laminar type dry cell.

The key validator accepts inserted keys, each having an individual code, and stores the codes in memory in association with assigned room numbers. Certain portions of the memories are addressed for guest keys, other portions for pass keys, and still others for emergency keys. As used in this specification, a pass key will normally be one assigned to hotel personnel, to enable them to enter a room for housekeeping services. An emergency key is one which cannot be shut out by a guest by pressing a night latch, and such keys are normally in custody only of a hotel manager.

The key validator element operates in two time frames, a first frame (F1) being employed during the introduction of data from a newly checked in key, and a second frame (F2) for the continuous transmission of memorized data to the room units for transmission to circuits associated with the lock mechanism. It will be apparent, that the key validator will be in the second frame for most of its operative duty cycle.

The circuitry associated with the lock of an individual room includes memory circuits which receive transmitted data destined for the individual room. The memory is of non-volatile type, so that it may retain data for extended periods in the absence of power, and is capable of functioning with data already stored should the key validator element become, for any reason, inoperative. This feature permits a guest who has been checked in to open his room until such time as his key has been checked out irrespective of desk operations. The lock unit is provided with a code card unique to each room which enables it to react only to that information pertaining to an individual room. It remains totally inoperative until a key having an individual code and a self-contained power source is inserted, at which time the lock circuits become powered, and receive signals through individual duty cycles which include the reception of signals from the room unit, whereby the circuits are placed in communication with the key validator. The lock circuits first examine new data to determine whether such data is already in memory storage, enter any new data not previously stored, and finally compare such data with the code on the newly inserted key to determine whether the key is valid. If valid, the lock is operated permitting the keyholder to enter. If not, the cycle of operation stops until the key is withdrawn and another key inserted.

When the guest checks out, his key is cancelled by the key validator, and this information is transmitted to the room unit to be available for the next duty cycle of the lock circuitry. Should the guest leave without surrendering his key, it is still possible to cancel the key code carried by such key by merely inserting zeros in the memory slot which previously stored the code. Should the key then fall into unauthorized hands, it can no longer be used to gain entry into the room to which it had been previously assigned.

With the foregoing in view, reference may be made to FIG. 1 of the drawing, which illustrates, schematically, a typical installation. The system, generally designated by reference character 10, comprises broadly a plurality of self-powered keys 11 (FIGS. 2 and 3), a key validator element 12 adapted to selectively receive the keys 11, a plurality of invidual room units 13, and a plurality of individual lock elements 14 with associated circuitry.

The individual keys 11 are most conveniently formed of planar synthetic resinous material, and may resemble, to some degree, a conventional credit card. Each key includes a planar base 20 having first and second surfaces 21 and 22, the former being suitable for the imprinting of any desired indicia. The surface 22 mounts a laminar type battery 23 having an output of approximately 5 volts, and maximum power output of approximately 5 watts. A printed circuit 24 determines a key code, and includes a positive terminal conductor 25, a negative terminal conductor 26, and a plurality of code-forming conductors 27, each having edge connectors 28. In the illustrated embodiment, the key element forms an eight bit code having the digital expression 10011001. If desired, or required, a greater number of bits may be used to determine the code.

The key validator element 12, as has been mentioned, is adapted to be positioned on the counter of a hotel desk (not shown) and is enclosed in a casing 30. A keyboard 31 includes a plurality of digit buttons 32, a check in button 33, a check out button 34, a button 35 for indicating the presence of a "pass key," a similar button 36 indicating the presence of an "emergency key," a clear button 37 and an enter button 38. The validator element 12 is interconnected by first and second conductors 39 and 40 to each of the room units 13, and all information in memory storage in the validator element is transmitted over these conductors for selective reception by the lock unit circuitry.

The room units 13 include individual housings 45 to permit mounting on a wall 46 of a room, preferably immediately adjacent an already existing one hundred ten volt AC outlet. A transmitting waveguide antenna 48 is mounted on the housing 45 in aligned relation with a receptor waveguide antenna 49 forming a part of the lock unit 14 (see FIG. 18). The room unit circuitry is relatively simple, including a data line 50 (FIG. 17) from the validator element which feeds a transistor 51 powered from a power supply 52, and in series with the primary winding of a pulse transformer 54, the secondary winding feeding an impatt diode oscillator 55. Where it is feasible to directly interconnect the output of the validator element to the lock unit, this structure can be eliminated. However, where installation is made in already existing buildings, compliance with local wiring codes causes such installation to be quite costly. In some cases, the two wire transmission from the validator element can be made using existing telephone lines already in the building, thereby still further simplifying installation.

The receptor antenna 49 feeds a detector 58 which will be activated upon the insertion of a key into the lock unit, the output of which is amplified at two stages as indicated by reference characters 59 and 60 and fed to a clock 61, the operation of which will be discussed more fully at a point later in the disclosure.

Figure 4:
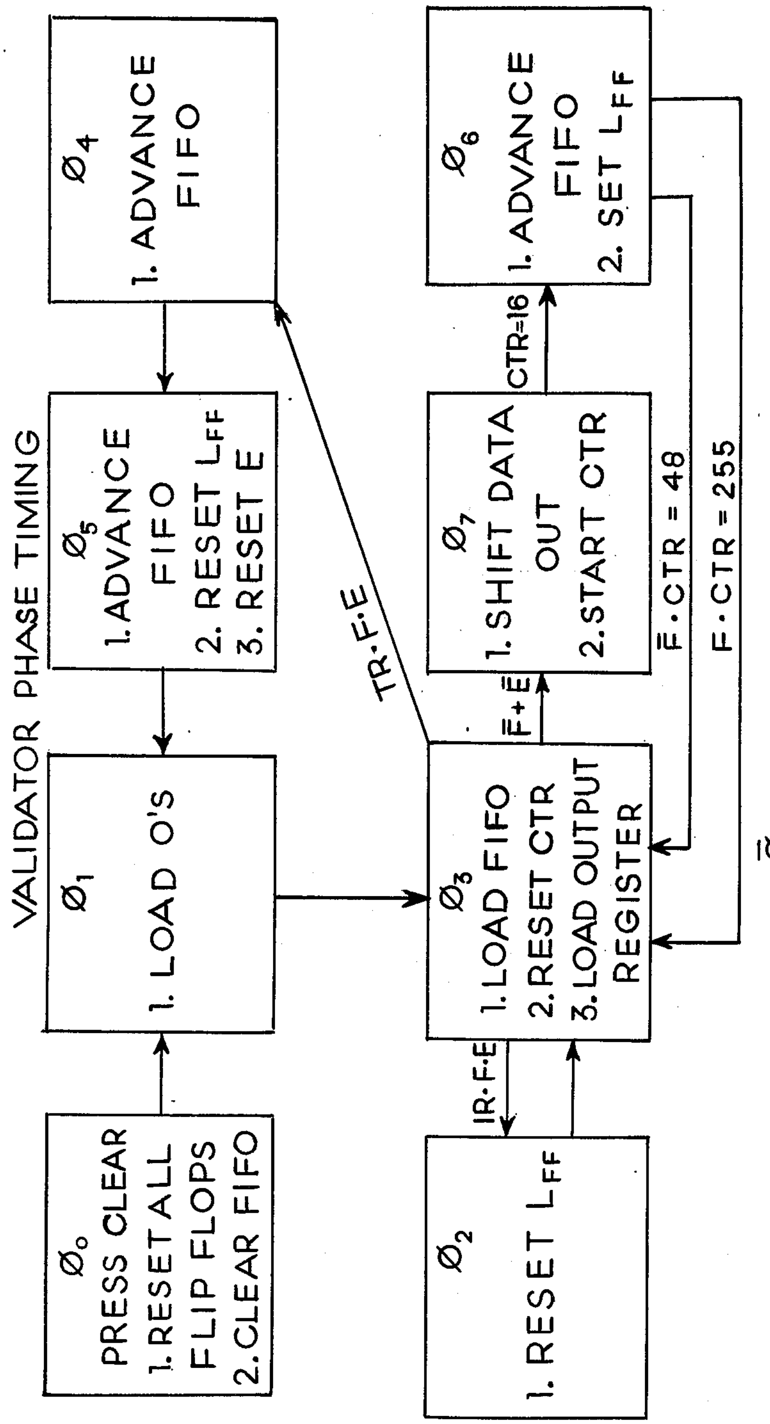
FIG. 4 is a block diagram showing phases of operation of a key validator element forming a part of the invention.

The circuitry of the key validator element 12 is illustrated in the drawings in FIGS. 4 to 10, inclusive. FIG. 4 is a phase diagram, and the remaining figures schematic diagrams. The phase diagram is useful for following the flow of activity in the system. For purposes of this disclosure, the expression "phase" is intended to designate a particular state of various flip-flops. The expression "frame 1" (F1) is intended to designate a time span during which data is being inserted. The expression "frame 2" (F2) is intended to indicate a time span when data is being cycled.

To begin operations (phase 0), the clear button 37 on the key validator keyboard is pressed. This resets the phase timing flip-flops 67, 68 and 69 (FIG. 5), the load flip-flop 70, and clears the FIFO (first in, first out) memory 71–72 (FIG. 10). The presence of phase 0 is determined by a "1 in 8 decoder" 73. The "0" output of this decoder is low when all three flip-flops 67, 68 and 69 are low due to the presence of the clear signal. The system is now ready for the insertion of new data from the key validator.

Progressing to phase 1, the next step is to load 0's into the memory 71–72 to provide a point of reference. The presence of a low input at the NOR gate 76 causes the output of the same to go high and the flip-flop 67 to go high at the next clock pulse. This is decoded by decoder 73 as "phase 1 NOT" and then inverted to phase 1 by invertor 77. During phase 1, the enable input of the multiplexers 78, 79, 80 and 81 (FIG. 10) is held high. The outputs of these units are then all zeros. These zeros are "written" into the FIFO memory 71–72 when the PL input goes high as a result of both a clock input and the output of NOR gate 82 going high due to phase "1 NOT" going low. Gate 82 feeds NAND gate 83.

The output, phase 1, causes the system to go to phase 3 on the next clock pulse by setting flip-flop 68. During phase 3, the memory is loaded with the information in the keyboard and the key code reader 63 (FIG. 10), discussed hereinafter. This information consists of four facts mainly: 1. Is a key being checked in or checked out? 2. Is the key being validated a guest, pass or emergency key? 3. The room number? 4. The keycode?

In the disclosed embodiment, only a one digit room code and an eight bit key code are used for simplicity in explanation. It will be understood by those skilled in the art that by extension of the disclosed structure, any number of room digits may be used, as well as any number of key code bits.

Multiplexers 78–81, inclusive, provide the information to be loaded into the memory 71–72. They provide the $I_0$ inputs, (the keyboard) when their S-terminals are low. The S-terminal input, $L_{ff}$, is low at this time as a result of having been reset at phase 0. Loading of the FIFO memory occurs as in phase 1, but at this instant, the input to NOR gate 82, phase 3, is low instead of high as in phase 1. This does not substantially alter operation, as gate 82 is a NOR gate.

Two additional functions take place during phase 3. First the counter 89–90 (FIG. 9) is reset. In addition, the output register 91–92 is loaded. Up to this point, the phase state has changed once with each clock pulse. However, in order to proceed from phase 3, other conditions must be satisfied as well. The next state is determined by which logic expression is satisfied.

If the system is being started with no previous memory inputs, the logic expression $IR.F_1E$ will be satisfied first, and the next state will be phase 2. This expression is satisfied because:

1. IR, indicating that the input to the FIFO is ready, is high because the FIFO is not filled.
2. $F_1$ is the time of the frame gap which occurs when the set of all 0's, loaded in phase 1, is at the output. Since this is the only input thus far, this condition obtains.
3. E is the condition where the enter key on the key validator is pressed. This sets flip-flop 96 (FIG. 7) to the E state and provides the E input.
4. These conditions are applied to the NAND gate 97, which will change the state from phase 3 to phase 2 when they are all "true" or high. At this time both the other logic expressions indicated, namely: 1. IR.F.E; and F+E. The former, because the condition "input not ready" is not true, and the latter because new data is being entered. During phase 2, the load flip-flop 70 (FIG. 8) is reset which then causes the multiplexers 78–81, inclusive, to present the output of the FIFO, $I_1$ as their output.

When phase 2 is applied to NOR gate 76 (FIG. 5), the system returns to phase 3. The only logic expression satisfied is still IR.F.E, so there is a return to phase 2. However, this time, the multiplexers 78–81 are set so that the output of the FIFO is returned to the input. The system then goes back to phase 3. This cycling between phase 3 and phase 2 continues until the FIFO memory is full, at which time the "IR NOT" signal becomes high and IR is low.

The equation $\overline{IR}$.FE is now true, so that the system goes to phase 4 as a result of the action of gate 98 (FIG. 5(*a*)). In this phase, the NOR gate 87 (FIG. 10) is activated which causes the FIFO to dump its output at the next clock pulse. This leaves one empty slot in the FIFO.

Figures 5A, 8A, 14, 15, 16:
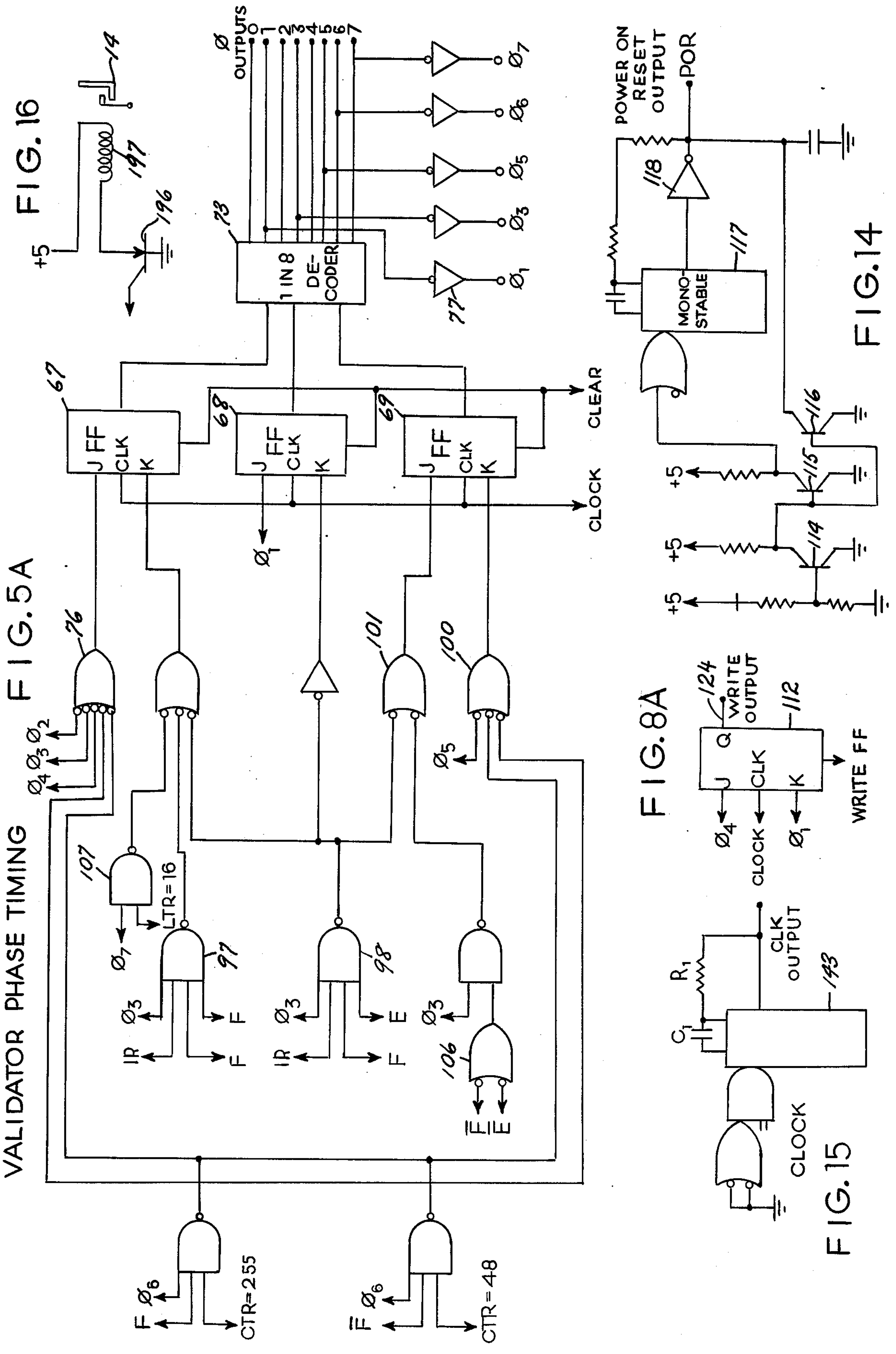
FIG. 8A is a schematic diagram of a write flip flop, forming a part of certain lock circuitry.
FIG. 14 is a schematic diagram showing resetting lock circuitry flip-flops upon the insertion of a key.
FIG. 15 is a schematic diagram of a lock circuitry clock.
FIG. 16 is a schematic diagram of a door lock solenoid mechanism.
Figure 11:
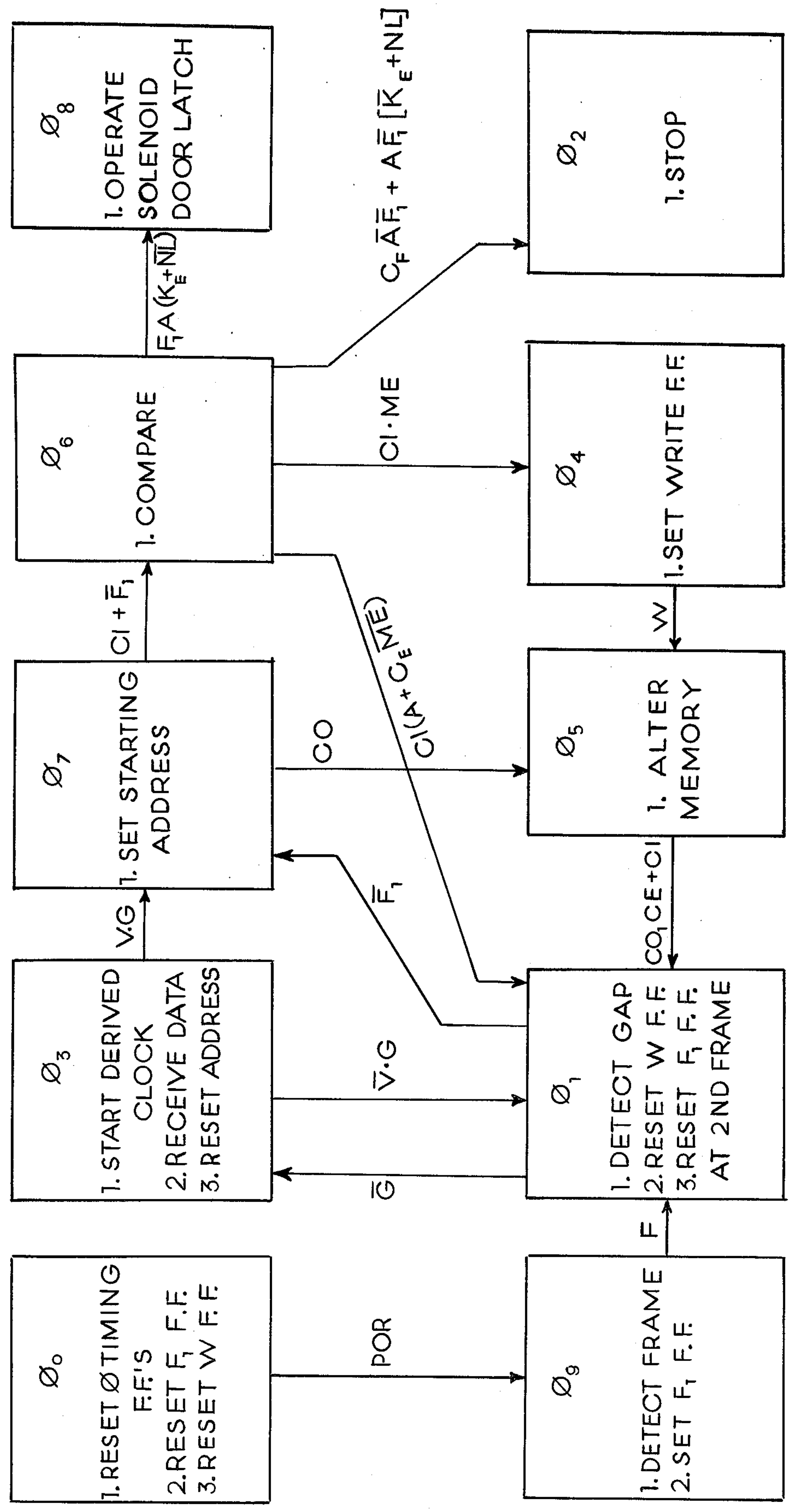
FIG. 11 is a block diagram showing phase timing of lock circuitry.

The system advances to phase 5, through the action of gate 76 (FIG. 5*a*). During this phase, another FIFO output is dumped, as in phase 4, leaving two empty slots in the FIFO. The load flip-flop 70 (FIG. 8) and enter flip-flop 96 (FIG. 7) and also reset during this phase.

From phase 5, the system returns to phase 1, due to the action of gate 100. During this phase, 0's are loaded into one of the open FIFO slots.

From phase 1, the system returns to phase 3 through the action of gate 101. The remaining empty slot in the FIFO is loaded with the FIFO output, the counter 102, 103 (FIG. 4) is reset and the output register 104–105 (FIG. 10) is loaded. The enter flip-flop 96 has been reset in phase 5, so that the only exit from phase 3 is to phase 7 through the equation $\overline{F}+\overline{E}$.

The system enters phase 7 through the action of NOR gate 106 (FIG. 5(*a*)). During phase 7, the counter is started, and data is shifted out of registers 104–105 until the count of 16 is reached. This completes one word of data.

The system enters phase 6 through the action of NAND gate 107 (FIG. 5(*a*)). During this phase, the FIFO is advanced leaving one empty slot and the load flip-flop 70 is reset. The system returns to phase 3 with a delay of either 48 or 255 counts, depending on whether or not a frame signal is present. These delays provide a small gap between data words stored in the memory, and a large frame gap when all stored words have been presented.

The cycle of phase 3 to phase 7 to phase 6 to phase 3, as a loop, is continued indefinitely until new data is entered, so long as the key validator remains in operation. This cycle provides the output data from the shift registers by recycling the data in the FIFO memory.

Upon the entry of new data (F1) to the key validator, the enter flip-flop 96 is activated. However, nothing will occur until the system returns to phase 3 during a frame period. The loop cycle between phase 3, phase 7, phase 6, phase 3 then stops, since the expression $\overline{F}+\overline{E}$ is no longer satisfied. When the loop stops at phase 3, the FIFO is loaded with the last output, thus filling the memory and making the expression $\overline{IR}$.E.F. valid. The action of gate 101 changes the state to phase 4. The FIFO is advanced so that one slot becomes empty, the frame slot which contained all zeros.

The action of flip-flop 76 changes the state to phase 5. The FIFO is again advanced to result in emptying the slot containing the oldest data. The load and enter flip-flops are also reset. The action of gate 100 (5(*a*)) changes the state to phase 1. In this state the zeros are reloaded to provide a frame position.

The action of gate 101 returns the system to phase 3. The new data is now loaded since $L_{ff}$ is low. The system now returns to the data output cycle phase 3, phase 7, phase 6, phase 3, as before.

Figure 5B:
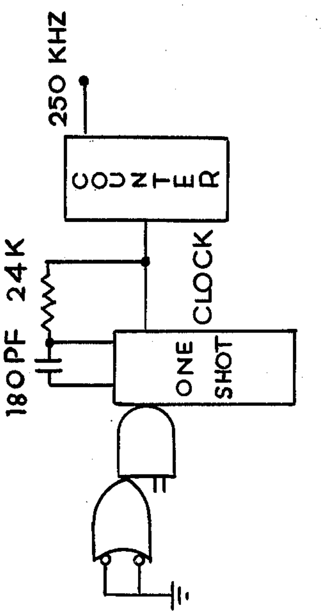
FIGS. 5*a* and 5*b* are a schematic electrical wiring diagram showing the circuits for accomplishing the functions shown in FIG. 4.
Figure 9:
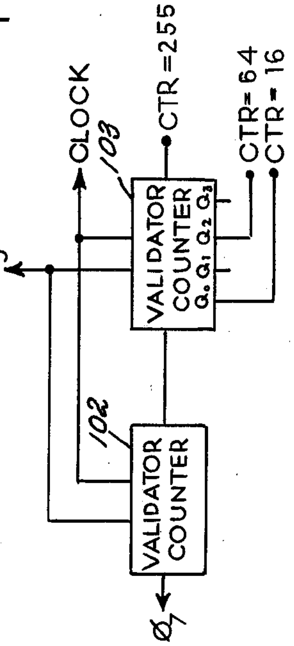
FIG. 9 is a schematic wiring diagram of a counter forming part of the key validator element.

As seen in FIG. 6, power is provided to the key validator by a conventional power supply 110 having plus 5 and minus 12 outputs 141 and 142, respectively, from one hundred ten volts alternating current. The logic elements used are preferably of the TTL compatible type of the 7400 series widely used in the art. The clock signal is preferably generated by a type 9601 retriggerable multivibrator 142(*a*) (FIG. 5*b*). The clock timing is not critical, but the time constant ($R_1C_1$) is preferably set for a 240KHz output.

Data from the key validator is in the form of a set of pulses at a level of five volts. As mentioned hereinabove, it can be distributed throughout the building by a single set of low voltage wires to each room. Since all of the data for the hotel is contained on one pair of wires, the pair can be run from room to room, and a distribution tree as would be required for telephones, for example, is not necessary.

Although the room unit 13 is disclosed as accepting data from the key validator line and converting it into a signal which is transmitted as a microwave link, it can also be accomplished by radio frequency energy transmission, lightwave transmission, infrared waves and the like. The microwave signal is preferably at 12 GHz. An oscillator of this type is currently available from Hewlett-Packard Corporation of Palo Alto, California. A type 5082–0611 diode is used to provide 2.5 watts of output. A suitable waveguide detector is also offered by Hewlett-Packard Corporation as type X424A.

Figure 12A:
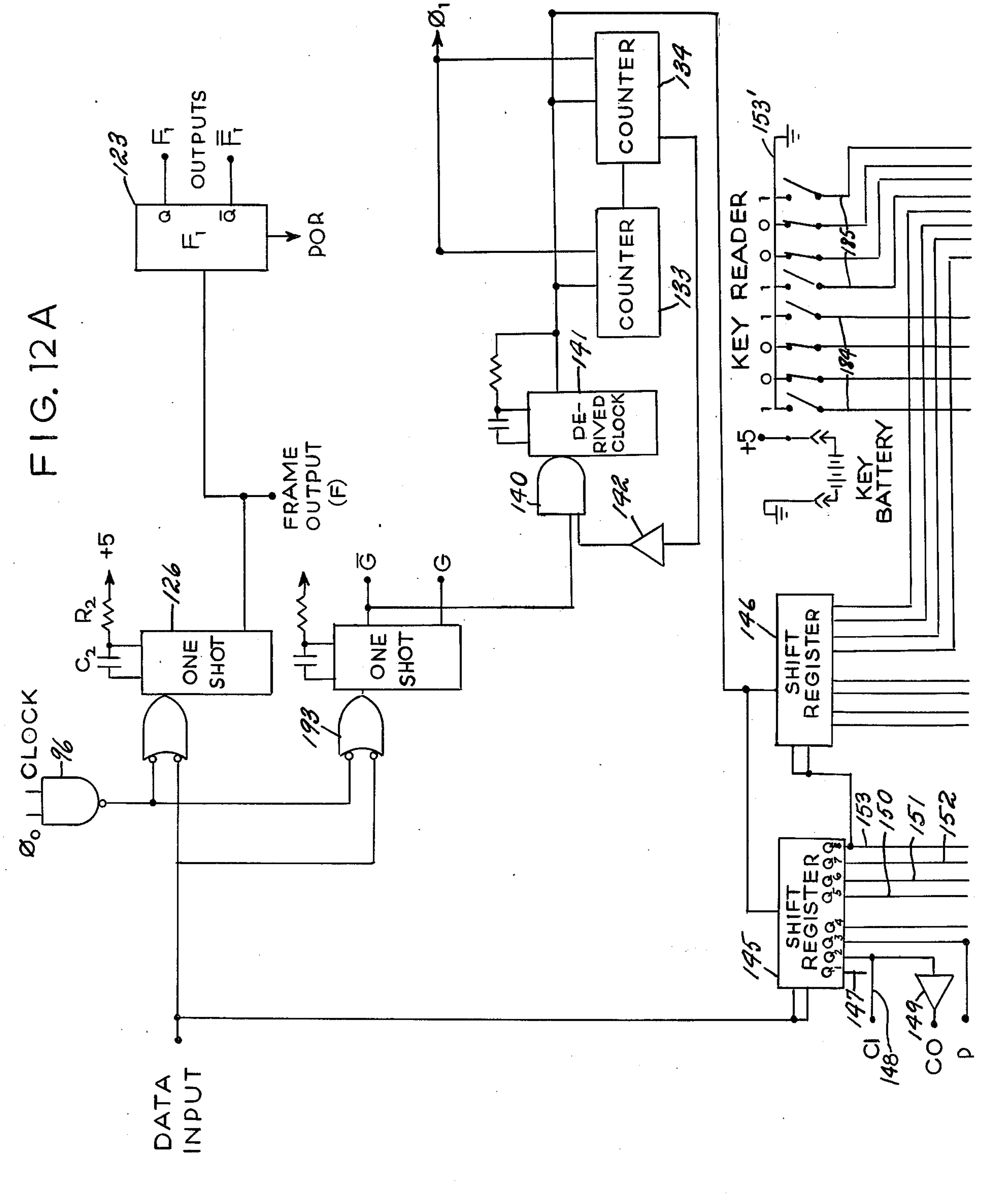
FIGS. 12*a* and 12*b* are a schematic wiring diagram of the lock circuitry.
Figure 12B:
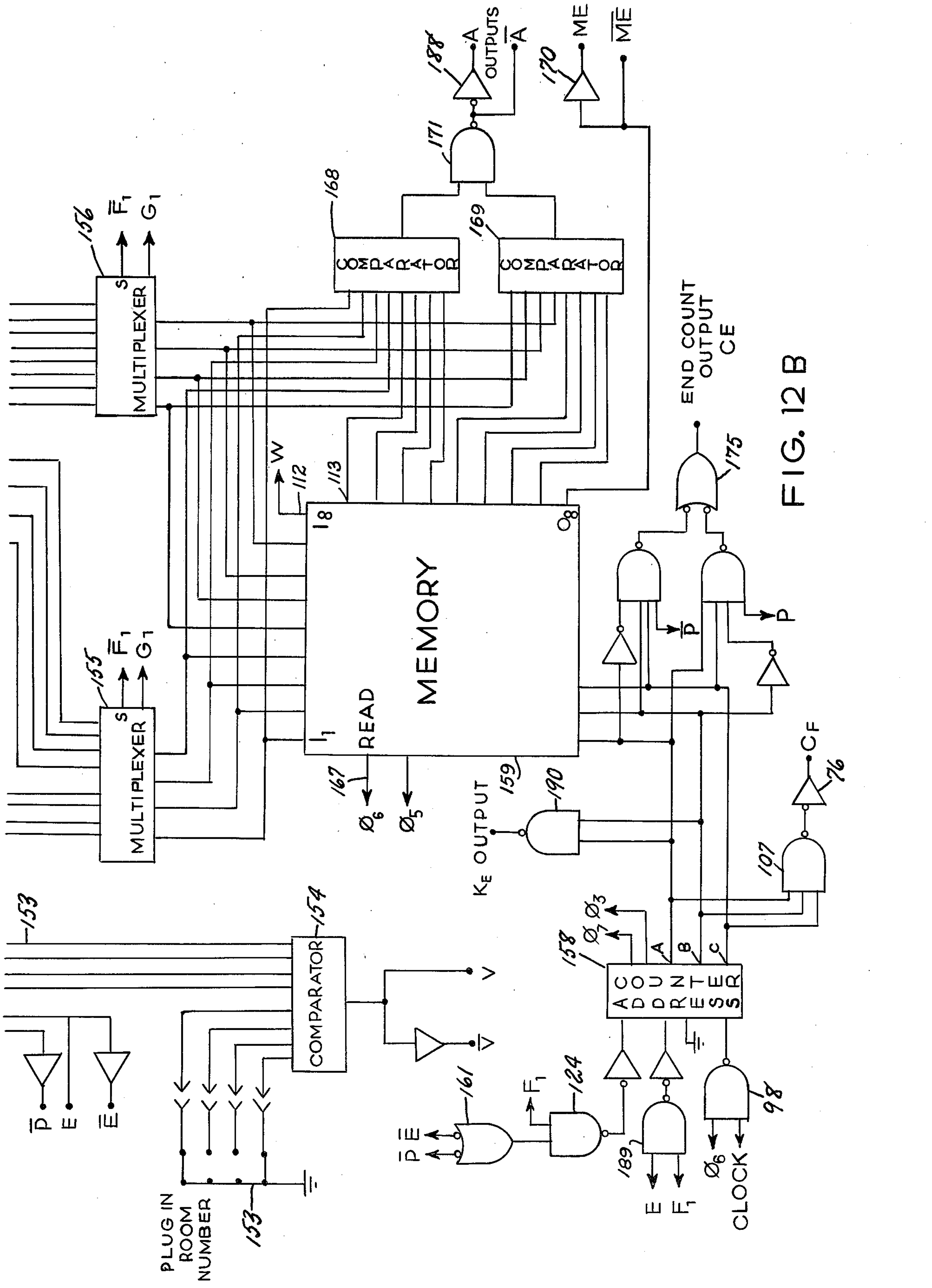

A consideration of the lock units 14 and associated circuitry will be facilitated by the use of a phase diagram (FIG. 12). In contrast to the phase operation of the key validator, employing eight states, the lock electronics employ ten states.

Referring to FIG. 12, operation commences in phase 0. This phase is initiated when a key, with its self-contained source of power is inserted into the lock adjacent the door. This insertion simultaneously powers the lock circuits.

Figure 8:
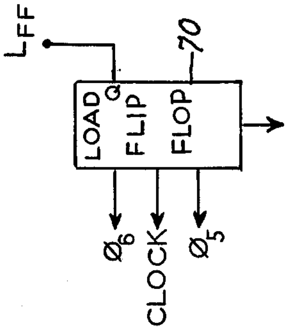
FIG. 8 is a schematic diagram of a load flip-flop forming a part of the key validator element.

With the application of power, the plus five volts is applied, after reduction, to the base of transistor 114 (FIG. 14). This causes the transistor to conduct heavily, which lowers its collector voltage. This, in turn, causes the collector voltages of transistors 115 and 116 to go high. This triggers the monostable multivibrator 117, which provides a pulse of 0.034 seconds as an output. This pulse, as inverted by inverter 118 forms the Power On Reset (POR). It resets the phase flip-flops 119, 120, 121, 122 (FIG. 13); the frame 1 flip-flop 123 (FIG. 12*a*), and the write output 124 (FIG. 8).

At the conclusion of the POR period, gate 125 (FIG. 13) causes a change to phase 9 by activating the J inputs of flip-flops 119–122. During phase 9, the F1 flip-flop 123 is set, indicating that this is the first frame of data received. The system remains in phase 9 until the retriggerable multivibrator 126 (FIG. 12(*a*)) turns "off." It is kept "on" by the presence of data on the Data Input Line. When no data is present for more than sixty four counts plus a guard band of sixty four counts, then a frame is being transmitted and multivibration 126 is turned off. The timing is determined by resistance-capacitance $R_2C_2$, which is set to provide a 500 microsecond pulse, the product of 128 counts at a 250KHz rate.

Figures 13, 18:
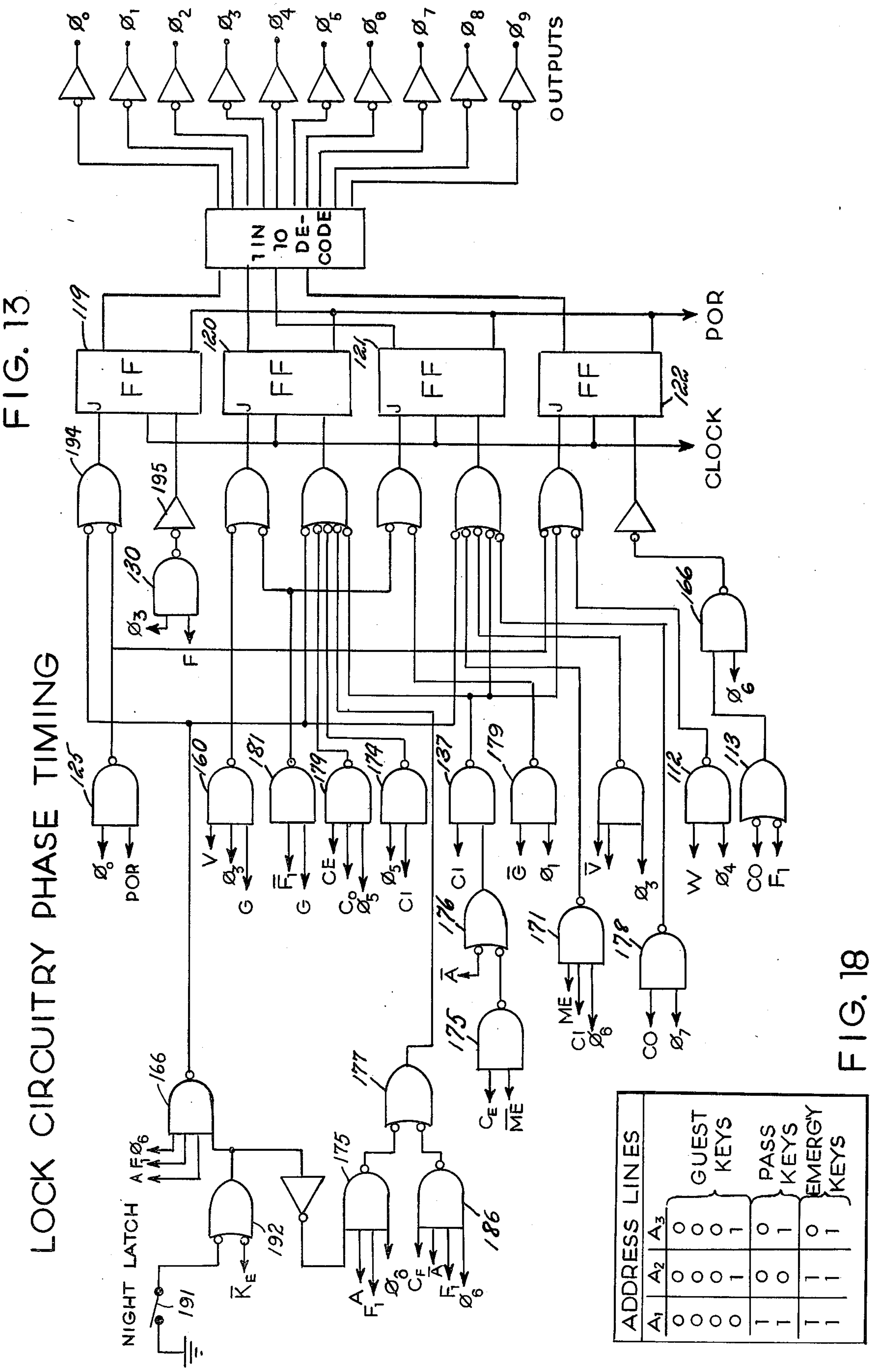
FIG. 13 is a schematic wiring diagram showing circuitry for effecting phase timing of the lock circuitry.
FIG. 18 is a graph showing assignment of address lines to lock circuitry memory.

The system then goes to phase 1 by the action of gate 130 (FIG. 13). While in phase 1, the following occurs:

1. The presence of gap is detected by the retriggerable multivibrator 126, which behaves similarly to gate 96, but with a much shorter time constant. The detected gap occurs between two data words, which is at most sixty four counts from the counter 133–134.
2. The write flip-flop 112 a and frame One flip-flop 113 are reset if not already in that state.

In order to leave phase 1, one of two conditions must be satisfied:

1. $\overline{G}$, that is to say, data is flowing;
2. $\overline{F_1}$, that is, not the first frame (F1).

At this point, the second condition cannot be satisfied, since we are now considering the first frame. The system therefore stays in phase 1, until data starts coming in, at which time it goes to phase 3.

The system is caused to go into phase 3 by the operation of gate 140. While in phase 3, the following occurs:

1. The derived clock (FIG. 12*a*) 141 is started. This clock is identical to that in the validator, but unlike the clock in the validator, it can be started and stopped. The clock is started by the $\overline{G}$ signal. It then continues to send clock pulses until stopped by the negative output from inverter 142. 142 goes negative when the counter 133–134 reaches a count of sixteen, the number of data bits in a data word. The sixteen bits of this derived clock are used to operate the shift register 145–146, which accepts serial data from the data line during this period. These sixteen bits are available as parallel outputs. The first output 147 from transistor Q1, the frame bit, is not used further. The output 148 from transistor Q2 is the "check in" bit. If low, "check out" is indicated, and this signal is available from the inverter 149. Similarly, the indication of whether a passkey (P), guest key ($\overline{P}$), or emergency key (E) is being transmitted, is available. The room number is available from outputs 150 to 153 in binary coded decimal. The transmitted room number is compared to the particular room number associated with an individual lock. This is determined by means of a plug-in card 153. In this case, for illustration, room number 6 has been used. If the data is not intended for room number 6, then the output of comparator 154 will be low which would indicate data that is not valid. Data containing the key code is also made available to multiplexers 155 and 156 (FIG. 12(*b*)) for comparison purposes.
2. The address counter 158 is reset to zero by means of the clear output. The address counter is used in conjunction with memory 159, a non-volatile, magnetic core memory which retains its information even when power is removed.

The next phase may be either of two possibilities. If the data is not valid, that is, it does not refer to room number 6, the next step is to return to phase 1, to wait new data. If the data is valid (refers to room number 6), then the system goes to phase 7 at the next gap.

The three types of keys "guest, pass and emergency" have been assigned slots in the memory 159 (see FIG. 18). For the purpose of this disclosure, eight slots have been assigned, although it is clear that any number may be assigned up to the capacity of the memory. For guest keys, four slots have been assigned, those consisting of the binary numbers corresponding to 0, 1, 2 and 3. Two slots have been assigned to pass keys, those consisting of the binary numbers corresponding to 4, and 5. Two slots also have been assigned to emergency keys, those consisting of the binary numbers corresponding to 6 and 7.

The initial address, that is the lowest numbered address is set up by the A, B and C inputs to address counter 158. For example, the initial address for the pass key is $A_1=1$, due to the action of the NOR gate 161 which has a high output when P not is low, $A_2=0$, and $A_3=0$, since the inputs to B and C are low. F1 is, of course, high during this period. The next states is determined by whether a "check in" or "check out" has been activated.

The "check in" system next goes to phase 6 as a result of the action of AND gate 166 (FIG. 13). The first step in this phase is to compare the key code given in the data to determine whether or not it is already in memory. The lowest address for this type of key has already been set in phase 7. The read line 167 is activated and the memory output is compared with the data input in comparators 168 and 169. (It should be noted that the multiplexers 155 and 156 are set to the $I_a$ or data lines because the S input, $F_1$ is low.) There are four possible results of the comparison, namely: 1. The data matches a memory word; 2. There is an empty slot; 3. There is no match; and 4. There are no more slots to compare in the memory.

In the first case there is a high output from "A" (indicating a code match). Since this is a check in, the first part of the expression $CI(A+CE\cdot\overline{ME})$ is satisfied and the system returns to phase 1 because this data word has already been processed.

In the second case, this data is not known to be in memory because the data is inserted in order, and the first empty slot indicates that no further comparisons need be made, the rest of the memory being empty. The memory empty indicator is the output of inverter 170. Each time a word is inserted in memory, a bit is inserted in $I_8$ of memory 159. If there is no bit at $0_8$, there is no word in memory. The next step then is to introduce this new data into memory. Since the expression CI·ME. (Check in, memory empty) is now fulfilled, the system will go to phase 4 through the action of AND gate 171. In phase 4, the load flip-flop 70 is set. This causes W line to be high. The system then goes to phase 5 through the action of gate 112 (FIG. 13). The data word is now written into memory 159 by the activations of the write mode. The address has not changed because the clock pulses to address counter 158 stopped when phase 6 went low. Therefore this word is written into the first empty slot in the memory. Since at this point the system is still in the check in mode, it next goes back to phase 1 as a result of the action of gate 140.

Returning to phase 6 and the third possibility, i.e. that there is no match, the address then changes at the next clock pulse and a new comparison is made. Finally, the fourth possibility arises, that there have been no matches and all the available slots in the memory for this type of key are filled. The system then disregards the data and returns to phase 1 because of the actions of gates 175, 186 and 177 due to the second half of the expression $CI(A+C\cdot E\cdot\overline{ME})$.

When "check out" is activated, the entire memory for that type of key (normally a guest key) is emptied. The system goes to phase 5 from phase 7 through the action of gate 178. The address has already been set for the first memory slot. The multiplexer 155–156 is not enabled because the E input is low. The output from this multiplexer is therefore low. The write flip-flop output from gate 122 is also low. All the inputs to the memory are low and the write input is activated. This causes the data in the slot to be "erased" by writing in zeros. The next clock pulse causes the memory to advance one slot and the action of erasure is repeated. Finally, the end of the slots reserved for this type of key is reached. The end count indicator $C_E$ goes high from gate 175, and the state returns to phase 1 through the action of gate 179.

After all of the data in the first frame has been processed as above described, the memory has been brought up-to-date, and the system can now determine if the inserted key is valid. The system is now in phase 1. It must have returned to this phase whatever the data inserted, or, if no data has been inserted. When the second frame (F2) arrives, the F1 flip-flop 123 (FIG. 12(*a*)) is reset. This changes state each time trigger 126 provides it with a clock pulse.

The state then changes to phase 7 through the action of gate 178. The starting address is set to all zeros since F1 is low.

The system goes to phase 6 as a result of the action of gate 166 caused by the second half of the expression $(CI+\overline{F1})$. The multiplexer 155–156 now presents the $I_1$ inputs from the memory and the key reader outputs 184 and 185 (FIG. 12(*a*)) to comparators 186 and 187, since F1 is high at the S inputs. In the particular case shown, the key code is 10011001. If this is matched by the code at this address, then there is a high A output from inverter 188. If not, the A output is low. In this case, the address changes at the next clock pulse and a new comparison is made with a following slot until the memory is exhausted. This is indicated by EF output at gate 189 going high. If there is a valid comparison, A is high, and the key is of the emergency type, as determined by gate 130 (from the address), then the system goes into phase 8 by the action of gate 192. If the key is not of the emergency type, that is, it is either a pass or guest key, and the night latch 191 in the room has not been set, the system also goes in phase 8 by the action of gate 130. If the guest has set the night latch, for the express purpose of locking out hotel employees or others, then only the emergency key will operate.

If there is no favorable comparison by the time the last memory slot has been compared, or, the night latch has been set and the key is not of the emergency type, then the system goes into phase 2, by the action of gate 194. During phase 2, no further action takes place and the system comes to a complete halt until the key is removed and another key inserted. If the system is in phase 8, then the positive output from inverter 195 will cause the silicon-controlled rectifier 196 (FIG. 16) to apply power to the solenoid-operated door latch 197, enabling the door to open. When the key is removed, the power is also removed and the silicon-controlled resistor is automatically reset.

The logic modules used in the lock circuitry are similar to those in the key validator circuitry. The memory differs in that it is of a random access non-volatile type. I wish it to be understood that I do not consider the invention limited to the precise details of structure shown and set forth in this specification, for obvious modifications will occur to those skilled in the art to which the invention pertains.

I claim:

1. A locking system for buildings, including a plurality of individual rooms having entry doors thereto and a central location from which keys to said doors are issued, said system comprising: a plurality of individual key elements, each defining an individual printed circuit code and having a self-contained source of electrical energy communicating with said circuit; a key validator element located at said central location for assigning the codes of individual keys to specific rooms on a manually performed random basis; a plurality of first memory means, one at each room, communicating with said key validator element over existing telephone lines in said building for storing data relative to assignment of an individual key code, said memory means being located in spaced relation relative to the corresponding room door; said room doors having individual solenoid operated locks; a plurality of lock-associated circuits having non-volatile memory means, wave propagation means associated with said first memory means for transferring data from said first memory means to said non-volatile memory means, and wave receptor means associated with said lock-associated circuitry for receiving such data; comparator means for comparing the code on an individual key with a code stored in said non-volatile memory means; said wave receptor means, comparator means and lock-associated circuitry being periodically powered by communication with the source of energy of an individual key when said key is placed in communication with said lock-associated circuitry.

* * * * *